July 23, 1940.                C. W. WALZ                 2,208,823
                           SUGAR BEET TOPPER
                       Filed Dec. 23, 1938          2 Sheets-Sheet 2
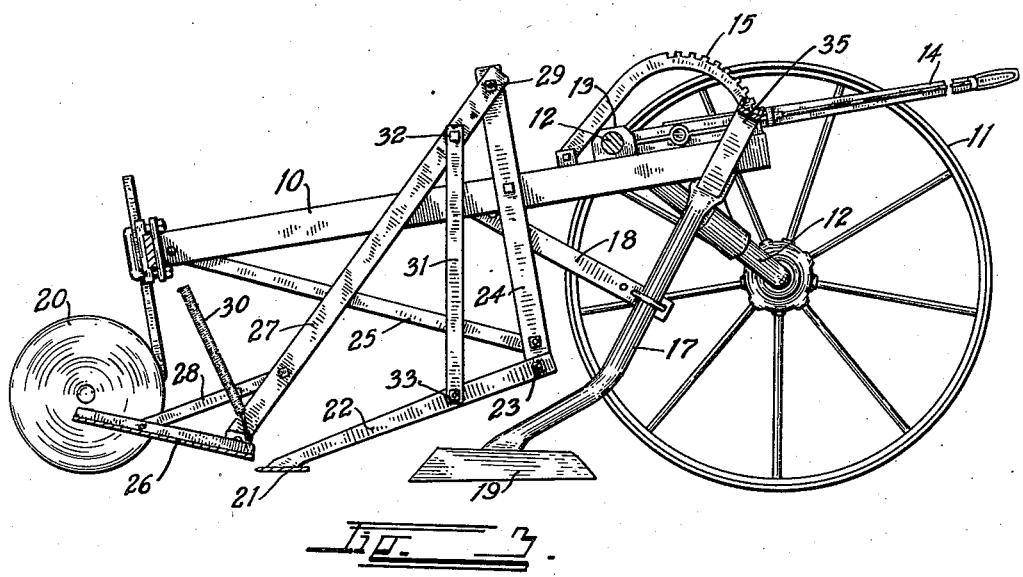
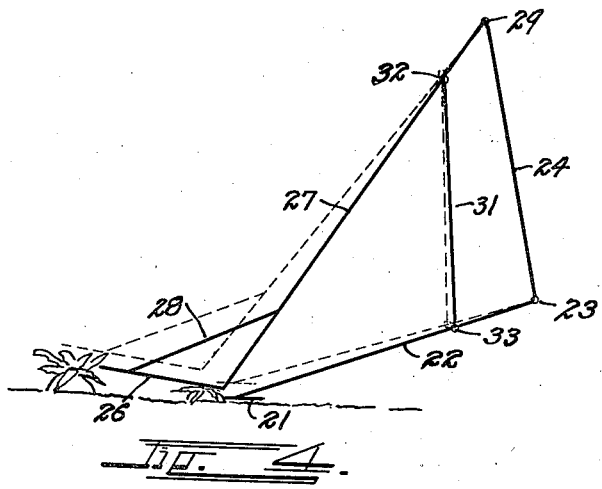
INVENTOR.
CLAUDE W. WALZ.
BY
                ATTORNEY.

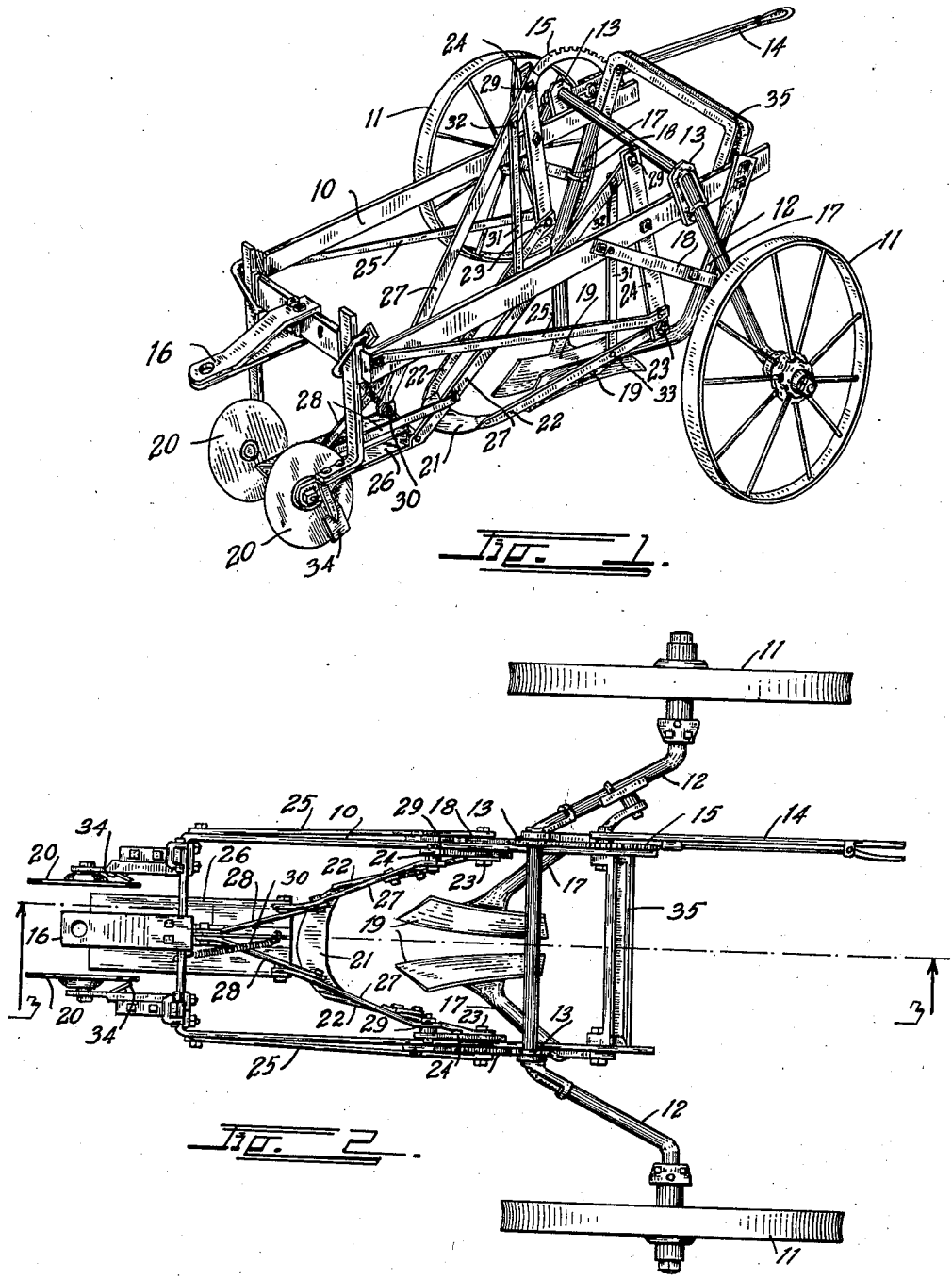

Patented July 23, 1940

2,208,823

UNITED STATES PATENT OFFICE 2,208,823

SUGAR BEET TOPPER

Claude W. Walz, Avondale, Colo.

Application December 23, 1938, Serial No. 247,389

7 Claims. (Cl. 55—9)

This invention relates to an improved sugar beet topper and digger and has for its principal object the provision of a beet topper which will remove the top from the beets while the latter are still in the ground and which will automatically operate to make a deeper cut in the larger beets than in the smaller beets.

In topping beets, it is always necessary to remove more top from a large beet than a small one due to the fact that the leaves and shoots grow downwardly on the rounded top of the beet. This machine is designed so as to automatically regulate the knife as to depth of cut in accordance with the size of the beet.

Beet toppers have been attempted in which a guide member passes over the beet in advance of the knife to raise or lower the latter. Such devices have not been successful due to the fact that the guide device will have passed completely over a small beet and began its descent on the far side thereof before the knife enters, thus causing the knife to take a deeper cut from the smaller beets than is desirable. Another object of this invention is to provide means which will regulate the space between the guiding member and the knife in accordance with the size or width of the top of the beet so as to bring the guide member and the knife relatively close together both horizontally and vertically on small beets so that the knife will enter the beet before the guide member leaves the beet top.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of the improved beet digger and topper.

Fig. 2 is a plan view thereof.

Fig. 3 is a longitudinal section taken on the line 3—3, Fig. 2.

Fig. 4 is a diagrammatic view illustrating the relative movements of the guide plate and knife at different elevations.

The improved digger and topper is supported from a main frame 10 which is carried at its rearward extremity upon ground wheels 11. The ground wheels are mounted on the extremities of an inverted, U-shaped axle 12 which is hingedly mounted in hinge hangers 13 on the frame 10. The axle can be rotated to elevate or lower the rear extremity of the frame to any desired height by means of a lever 14 which cooperates with a toothed locking segment 15. The forward extremity of the frame 10 is supported upon a tractor or other traction device by means of a suitable draw bar 16.

A pair of digger arms 17, braced by means of suitable braces 18, extend downwardly from the frame 10 and terminate in digging plows 19 of any suitable design. The forward extremity of the frame 10 carries a pair of rolling coulters 20 adjustably positioned to travel along each side of a row of beets. The coulters 20 may be provided with mud scrapers 34 if desired.

A sharpened topping knife 21 is supported ahead of the plows 19 upon a pair of knife arms 22. The knife arms 22 are pivoted at 23 on the lower extremity of a pair of fixed vertical standards 24. The standards 24 are maintained at a fixed angle with the frame 10 by means of brace beams 25.

An inclined gauge plate 26 is supported ahead of the knife 21 upon the lower extremities of a pair of gauge arms 27. The forward extremity of the gauge plate 26 is supported by means of a V-shaped brace extending rearwardly to the arms 27. The upper extremities of the gauge arms 27 are hinged at 29 upon the upper extremities of the standards 24. The lower extremities of the gauge arms are flexibly supported by means of a tension spring 30 which extends from the frame 10 downwardly to the gauge plate 26. A connecting rod 31 connects the gauge arm 27 with the knife arm 22 at each side of the frame. The connecting rods are pivoted at 32 to the gauge arms and at 33 to the knife arms.

It is desired to call attention to the fact that the distance between the pivot points 29 and 32 on the gauge arms 27 is less than the distance between the points 23 and 33 on the knife arms.

In use, the device is drawn along a row of beets by means of a tractor or other power device. The lever 14 is adjusted to lower the plows 19 into the ground to the proper position for digging. The coulters 20 are adjusted to slightly enter the ground so that they will cut away any projecting leaves at each side of the row and also so that they will serve to loosen the top soil at each side thereof.

As a beet is approached, the inclined gauge plate 26 slides over the beet. If the beet is a large beet projecting above the ground, the plate 28 will be raised, thus raising the forward extremities of the gauge arms 27. This upward movement will be communicated to the knife arms 22 by means of the connecting rods 31 causing them to swing the knife arms upwardly to raise the knife. Referring to the diagram of Fig. 4, it will be noted that the knife does not elevate as rapidly as the gauge plate, due to the difference in distance between the pivots 29 and 32 and the pivots 23 and 33. Therefore the vertical distance between the plates 26 and the knife 21 will increase as the plate raises and, since the height of the plate is dependent upon the size of the beet, the depth of the cut made by the knife will be automatically regulated in accord with the size of the beet. Should a low, small beet be encountered, the plate 26 will fall thereby lowering the knife 21. In lowering it will approach the knife 21 so that although the knife will be lowered to cut the low beet, the top cut therefrom will not be as deep as the cut from a large beet.

It is also desired to call attention to the fact that due to the difference in angle between the arms 22 and 27, the latter being the nearer vertical, the horizontal distance between the gauge plate and the knife will decrease as the gauge plate lowers and increases as it raises. Therefore, in a small beet, the knife will enter horizontally closer to the gauge plate than in a large beet thereby automatically adjusting itself for the difference in width in the beet crowns.

The plate 26 is counterbalanced by the spring 30 and is relatively long and positioned on the arms 27 at a very gradual angle so that it can be easily elevated by the beets as the device is drawn therealong. After the tops are severed, the plows 19 will enter the ground, dig and lift the topped beets to the surface ready for piling or loading.

The frame 10 is preferably formed of a single flat bar bent into a U-shape with the open side of the U at the rear. This open side is secured together by means of an inverted U-shaped yoke member 35 of sufficient height to clear any accumulated beet tops on the row.

It is desired to call attention to the fact that the knife arms 22 lie at a very slightly inclined angle from the horizontal and that the pivot point 23 is almost directly behind the knife so that the knife is held in a lightly floating position in which it will place no pressure upon the beet.

Experiments were conducted with this pivot point at a higher elevation and it was found that the resistance of the knife tended to swing the knife arms backwardly and in swinging backwardly they would exert a downward pressure on the beet which would break away the far side thereof. This entire difficulty was avoided by the low position of the pivot points 23. The latter are so positioned that the arms 22 are at least less than 45° from the horizontal and preferably less than 25° from the horizontal.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said guage arms ahead of said knife, all of said arms being pivoted at their point of connection with said frame, the pivot points of the gauge arms being spaced from the pivot points of the knife arms; and connecting members extending between said gauge arms and said knife arms to transmit the movements of the gauge arms to the knife arms.

2. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said gauge arms ahead of said knife, all of said arms being pivoted at their point of connection with said frame; the pivot points of the gauge arms being positioned above the pivot point of the knife arms; and connecting members extending between said gauge arms and said knife arms to transmit the movements of the gauge arms to the knife arms.

3. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported to the forward extremities of said gauge arms ahead of said knife, all of said arms being pivoted at their point of connection with said frame, the pivot points of the gauge arms being spaced away from the pivot points of the knife arms; and connecting members extending between said gauge arms and said knife arms to transmit the movements of the gauge arms to the knife arms, said knife arms being normally positioned at less than 25° from the horizontal, said gauge arms being positioned at a relatively steep incline from the horizontal.

4. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said gauge arms ahead of said knife, all of said arms being pivoted at their point of connection with said frame, the pivot points of the gauge arms being spaced away from the pivot points of the knife arms; and connecting members extending between said gauge arms and said knife arms to transmit the movements of the gauge arms to the knife arms, said gauge plate extending forwardly and upwardly at a fixed angle from the lower extremities of the gauge arms, and flexible means for yieldably supporting said gauge plate.

5. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said gauge arms ahead of said knife, all of said arms being pivoted at their point of connection with said frame; the pivot points of the gauge arms being positioned above the pivot point of the knife arms; and connecting members extending between said gauge arms and said knife arms to transmit the movements of the gauge arms to the knife arms; the points of connection between said connecting members and said arms being such that the movements of the gauge arms will be transmitted to the knife arms at reduced magnitude.

6. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said gauge arms ahead of said knife, all of said arms being pivoted at their point of connection with said frame; the pivot points of the gauge arms being positioned above the pivot point of the knife arms; and connecting members extending between said gauge arms and said knife arms to transmit the movements of the gauge arms to the knife arms, the distance between the gauge arm pivots and the connecting members being less than the distance between the knife arm pivots and the connecting members.

7. A beet digging and topping device comprising: a frame; wheels supporting the rearward extremity of said frame; a pair of plow beams extending downwardly and forwardly from said frame; digging plows carried on the lower extremities of said beams; a knife arm extending forwardly from said frame at each side of said plows; a knife connecting the forward extremities of said knife arms; gauge arms extending downwardly and forwardly from said frame; a gauge plate supported at the forward extremities of said gauge arms ahead of said knife, all of said arms being pivoted at their point of connection with said frame, the pivot points of the gauge arms being spaced away from the pivot points of the knife arms; and connecting members extending between said gauge arms and said knife arms to transmit the movements of the gauge arms to the knife arms, said knife arms being positioned at less than 25° from a horizontal plane.

CLAUDE W. WALZ.